(No Model.)
J. BOTTOMLY & J. C. SHAW.
BRAKE PIPE COUPLING.
No. 541,714. Patented June 25, 1895.
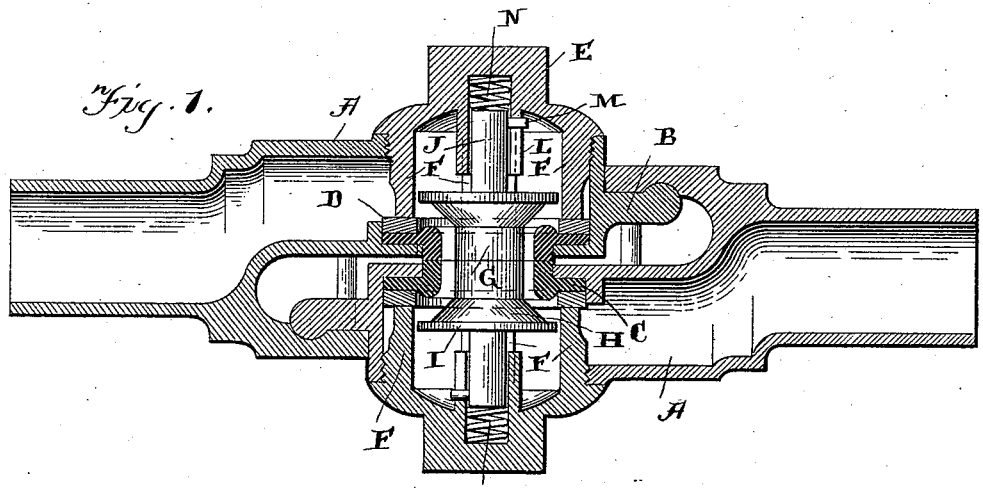
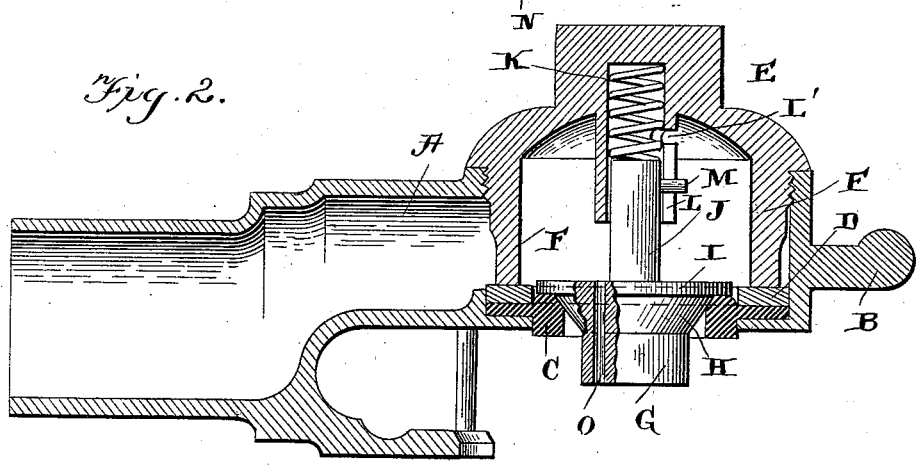
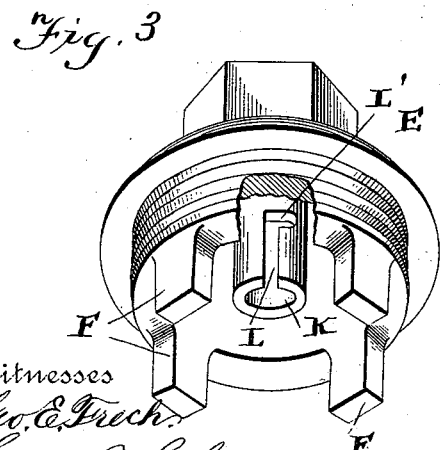
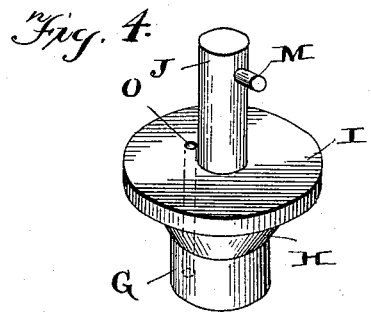
Witnesses
Geo. E. Frech.
Homer B. Harlan.
Inventors
James Bottomly
James C. Shaw
By Attorneys

UNITED STATES PATENT OFFICE.

JAMES BOTTOMLY AND JAMES C. SHAW, OF BROOKFIELD, MISSOURI.

BRAKE-PIPE COUPLING.

SPECIFICATION forming part of Letters Patent No. 541,714, dated June 25, 1895.

Application filed September 19, 1894. Serial No. 523,477. (No model.)

*To all whom it may concern:*

Be it known that we, JAMES BOTTOMLY and JAMES C. SHAW, of Brookfield, in the county of Linn and State of Missouri, have invented certain new and useful Improvements in Brake-Pipe Couplings; and we do hereby declare the following to be a full, clear, and exact description of the invention, such as will enable others skilled in the art to which it pertains to make and use it, reference being had to the accompanying drawings, which form part of this specification.

Our invention relates to an improved brake pipe coupling; and the object of the same is to provide the coupling heads with automatic co-acting valves which when the coupling is broken close the pipes and which are opened when the coupling sections are united.

A further object of our invention is to so construct the coupling that the brake will be instantly set in case the train becomes divided.

A further object of our invention is to so construct the coupling that either section thereof may be used in conjunction with a coupling of different construction.

With these objects in view our invention consists in the novel features of construction hereinafter described and claimed, and illustrated in the accompanying drawings, in which—

Figure 1 is a cross-sectional view of the coupler-sections united. Fig. 2 is a similar view of one of the sections detached with the valve closed. Fig. 3 is a detailed view of the removable plug upon the outside of one of the sections. Fig. 4 is a similar view of the valve.

The construction of the coupler sections being exactly the same we will proceed to describe only one of them.

A designates the head secured in the usual manner upon the end of a hose section and provided upon its inner side with the usual interlocking flanges B. The port upon the inner side of the head is surrounded by the packing rings C upon which rests the metallic ring D.

E is the screw plug upon the outer side of the head, having upon its inner side the projecting lugs F which are adapted to bear upon ring D when the plug is screwed to position thereby holding the packing rings C positively in position around the said port. The valve consists of the cylindrical outer portion G which when closed extends slightly beyond the inner surface of the head and which terminates in the enlarged tapering portion H which has at its base the annular shoulder I which with the tapering portion is adapted to rest upon the packing rings C and thus effectually close the port. The stem J of the valve is adapted to project rearward into the plug, a well K being formed in the latter for its reception, and the said well is slotted at L to receive the pin M on said stem and at the base of the said slot L is the cross slot L', the whole constituting a bayonet slot, into which the said pin is adapted to be turned when it is desired that the valve be held back for the purpose of connecting the coupler section with another coupler sections of different form and construction. A coiled spring N is confined in the well for bearing upon the stem and thus holding the valve normally to its seat or closed.

When the coupler sections are united as shown in Fig. 1 the valves bear against each other and are thus automatically pushed backward or opened against the pressure of the coiled springs which of course immediately close them as soon as the pipes are uncoupled.

By means of the bayonet slot construction above described it will be seen that the coupler sections may be readily used in connection with other valve couplings or couplings not provided with valves, as the valves in our device are held back entirely out of the way of the bearing faces of the coupler head. Each valve is provided with a small bore or port O leading through its outer end which permits the escape of air when the couplings are detached either through accident or otherwise thus setting the brakes automatically. This feature is of special importance in case a train becomes divided as the brakes upon the detached portion will immediately set and stop the train while it will be impossible to set the brake on the forward portion of the train as the pump on the locomotive will force air into the train pipe faster than it can escape through the port O, thus enabling the train to run to the next station in safety and avoid collision of the two sections.

The screw plug entirely closes the outer sides of the coupler sections and is readily adjusted to position and removed therefrom by the wrench hold P as will be readily understood.

By use of the coupler here shown and described it will be seen that all stop cocks and cut off valves are dispensed with so that no such device need be thought of in coupling the cars; nor is it possible for evil disposed persons to cut the brakes as the hand operated devices referred to above are entirely dispensed with.

Having thus fully described our invention, what we claim as new, and desire to secure by Letters Patent, is—

A coupling for air brake pipes comprising a hollow coupling member having the inner port with the inner surrounding shoulder, the packing on said shoulder and in the port, the ring on the packing, the screw plug closing the outer side of the member and having the separated feet resting on said ring, the inwardly extending central well in the plug having the longitudinal slot with the offset at its inner end, the spring in the well, and the valve having the outer portion projecting through the port, the tapered and shouldered valve portion fitting the packing, and the inner stem in said well and having a lateral pin in the groove, substantially as described.

In testimony whereof we affix our signatures in presence of two witnesses.

JAMES BOTTOMLY.
JAMES C. SHAW.

Witnesses:
E. E. WARD,
W. E. LEGITT.